Jan. 8, 1946.  G. W. WILLARD  2,392,350
ULTRASONIC CELL
Filed Dec. 2, 1942

INVENTOR
G. W. WILLARD
BY
G. F. Heuerman
ATTORNEY

Patented Jan. 8, 1946

2,392,350

UNITED STATES PATENT OFFICE 2,392,350

ULTRASONIC CELL

Gerald W. Willard, Fanwood, N. J., assignor to Bell Telephone Laboratories, Incorporated, New York, N. Y., a corporation of New York Application December 2, 1942, Serial No. 467,652

14 Claims. (Cl. 88—61)

This invention relates to compressional wave devices and more particularly to a method of and means for absorbing compressional waves after propagation through the wave propagating medium of an ultrasonic cell.

Ultrasonic cells are disclosed, for example, in my Patent No. 2,287,587, granted June 23, 1942, and in my applications Serial No. 467,650, filed December 2, 1942 (Patent No. 2,345,441, granted March 28, 1944), and Serial No. 467,651, filed December 2, 1942 (Patent No. 2,366,822, granted January 9, 1945). In such devices a liquid medium is preferably employed for propagating compressional waves set up therein by a vibratory means such as a piezoelectric crystal. In ultrasonic light valves, for example, it has been found necessary to dissipate the compressional wave energy after propagation through the portion of the cell in which the light diffraction takes place in order to prevent reflection of a compressional wave which would interfere with the directly propagated wave in the portion of the cell in which light diffraction takes place.

According to the invention there is employed for absorbing compressional waves propagated through a liquid wave propagating medium, a second body of liquid having the same acoustic, or compressional wave, impedance as the first and having a fibrous or other suitable material therein—a tightly packed pad of animal wool one-half inch thick, for example. Where the ultrasonic cell is to be used for controlling light modulation, it has been found desirable to keep the absorbing medium separate from the portion of the cell through which the light beam is directed in order to prevent scattering of light by particles of the animal wool or other material in the liquid, which particles may become detached from the pad of fibrous material.

In accordance with a specific embodiment of the invention herein shown and described, contamination of the liquid in an ultrasonic cell through which light is transmitted is prevented by setting the fibrous material in a gel. Household gelatin dissolved in hot water, in the proper proportions to make a moderately stiff gel when cooled to room temperature, is poured over the compact wool pad so that the pad is immersed in the liquid. When the gelatin has set the excess which extends beyond the dimensions of the pad is cut away. The gelatin having the wool pad embedded therein, which has an acoustic impedance substantially equal to that of water, is then used as the compressional wave absorber in the ultrasonic cell. Chlorobenzene or dichloro-diethyl benzene, for example, may be used as the liquid through which compressional waves are propagated to cause diffraction of the light transmitted through the liquid in accordance with the amplitude of the compressional wave. These liquids have an acoustic impedance substantially equal to that of water and do not dissolve, attack or change the water gel in any way.

In accordance with another specific embodiment of the invention, the compressional waves which are propagated through a suitable liquid medium are absorbed by a second body of liquid in which is immersed a tightly packed pad of mineral or animal wool, the two bodies of liquid being separated by a partition, of metal or other suitable material, which does not reflect to any appreciable extent the compressional waves which reach it. The same liquid may be used on each side of the partition if desired but it is often preferable to employ in the wave absorbing portion of the cell a liquid having substantially the same acoustic impedance as the liquid in the wave propagating portion but having a higher absorption constant. For example, if water is used as the wave propagating medium, carbon disulphide or chloroform may be used in the wave absorbing portion of the cell, carbon disulphide being about two hundred times and chloroform being about ten times as absorbing as water.

There would be no reflection of compressional wave energy from the partition if it were made of a material having an acoustic impedance substantially equal to that of the liquid medium used in the cell. However, when the partition is made of a material, metal, for example, having an acoustic impedance which differs considerably from that of the liquid, in order to substantially prevent reflection from the partition it should have a thickness equal to one-half wave-length of the compressional wave in the partition material or to an integral multiple thereof, or the partition should be very thin compared to a half wave-length. As the thickness is increased in steps of a half wave-length the frequency range of the compressional waves which can be transmitted without a substantial amount of reflection is correspondingly reduced. Therefore where the frequency band width of the modulating wave is small with respect to the carrier frequency (a modulated carrier electromotive force being used to control the vibratory means for setting up the compressional wave in the liquid), the thickness of the partition may be equal to several wave-lengths of the compressional wave in the partition without causing appreciable reflection from the partition.

The wave-length $\lambda$ of a compressional wave in the partition material may be calculated from the formula $$\lambda = \frac{v}{f}$$

where $v$ is the velocity of the compressional wave in the material and $f$ is the frequency of the wave. The correct thickness of partition material may also be determined by testing a number of samples in the cell of an ultrasonic light valve employing a slit type entrance and exit apertures and a lens system which focusses an image of the cell upon a screen. A pronounced color dispersion pattern is produced upon the screen with this arrangement. For this test the sample is so placed in the liquid that it completely intersects a portion of the ultrasonic beam which is in the path of a part only of the light beam so that the remainder of the light beam is modulated by the remaining portion of the ultrasonic beam as if the partition were not present. By comparing the color pattern on the screen produced by light coming from the portion of the cell having the partition material therein with that produced by light coming from the portion of the cell having no partition material therein, it may be determined whether substantially all of the compressional wave energy is being transmitted through the partition material or whether a substantial part of the energy is being reflected. It may also be determined whether the partition material is reflecting a substantial amount of compressional wave energy by observing an image of the portion of the cell between the source of compressional waves and the partition material. A substantial amount of reflection from the partition material will cause interfering wave patterns to be set up on the screen when the partition material is moved out of the plane normal to the direction of wave propagation while being maintained parallel to the direction of light transmission through the cell.

Referring to the accompanying drawing.

Figure 2:
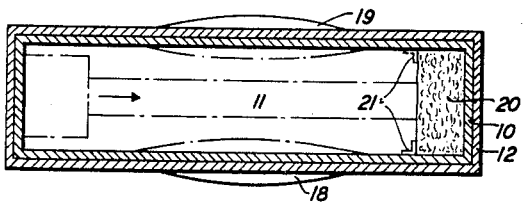
Fig. 2 is a view taken along the line 2—2 of Fig. 1.
Figure 1:
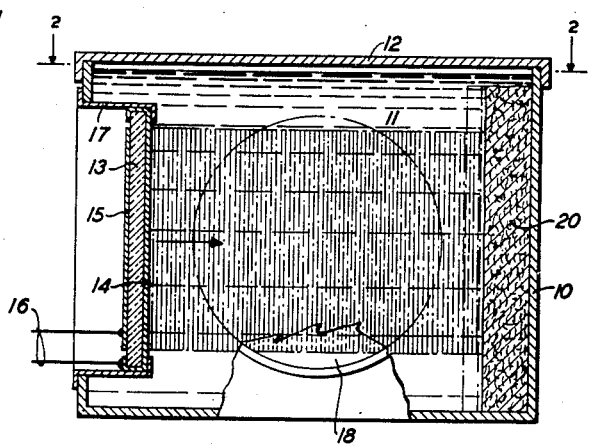
Fig. 1 is a view in front elevation partly in section of an ultrasonic cell embodying the invention.

The ultrasonic cell of Figs. 1 and 2 comprises a tank 10 containing a liquid 11 and having a removable cover 12. Compressional waves are set up in the liquid by a piezoelectric driver comprising a piezoelectric crystal 13 and inner and outer electrodes 14 and 15, respectively, which may be plated on the crystal surface, the driver being energized by energy supplied from a source of electric energy, not shown, through the leads 16. The piezoelectric driver is mounted in an opening in the tank wall by means of a copper foil strip one edge of which is soldered to the tank wall and the other edge of which is soldered to the plating forming the inner electrode 14 of the piezoelectric driver. A light beam to be modulated may be directed through the lenses 18 and 19 mounted in the front and back walls, respectively, of the tank 10.

After the compressional waves set up by the piezoelectric driver 13, 14, 15 have been propagated through the liquid 11 in the direction indicated by the arrow, it is desired to prevent reflection of the waves into the portion of the liquid through which light is directed by way of the lenses 18 and 19 since the reflected waves would interfere with the directly transmitted waves. To prevent this undesired reflection, an absorber 20 is provided. The absorber 20 comprises a compact pad of heterogeneous fibrous or granular material set in a liquid gel, the thickness of the pad being of the order of one-half inch. The acoustic impedance of the liquid used in making up the gel should preferably be equal to that of the liquid 11 and, moreover, the gel should not be dissolved or attacked by the liquid 11. If chlorobenzene or dichloro-diethyl benzene, for example, is used as the liquid 11, the absorber may be made up by immersing a compact pad of animal wool in a solution of household gelatin dissolved in hot water in proper proportions to make a moderately stiff gel when cooled to room temperature. When the gelatin has been cooled, the excess which extends beyond the pad is cut away. The gelatin per se plays no significant part in the absorption of the compressional waves, its purpose being to prevent particles of the fibrous material used in the absorber from reaching the liquid 11 and thus causing unwanted scattering of the light transmitted through the cell. The absorber 20 is held in place by angle strips 21 secured to the walls of tank 10.

While there may be used in the absorber 20 fibrous material other than animal wool immersed in a liquid, an absorber employing animal wool has been found to be preferable to one employing metallic wool. This is probably due to the fact that a pad of animal wool has a more irregular surface than a pad of metallic wool. Particles of material or voids or gas bubbles in the gel may also be used. Satisfactory results may also be obtained by immersing a cellulose sponge in a liquid. When fibrous material is used, for example, the material should have an acoustic impedance different from that of the liquid or gel so that compressional wave energy impinging upon a fiber will be partly transmitted through the fiber and partly reflected. Moreover, the wave velocity through the fiber should be different from that through the liquid so that energy which passes through the fiber will leave its boundary at least slightly out of phase with respect to the energy that goes between the fibers, the phase displacement depending upon the thickness of the fiber and the difference between the velocity through the fiber and the velocity through the liquid or gel. The phase displacements will cause movement of the particles with respect to the liquid and hence absorb energy. The phase displacements will also cause interference in the ultrasonic beam. Moreover, the fibers being chaotically distributed, the compressional wave is redirected or scattered over a wide angular range. The length of the path in the liquid or gel over which the wave travels is thus greatly increased and the wave attenuation is increased due to the greater length of travel through the liquid. Only a negligible amount of the wave energy is reflected into the body of liquid 11 through which a light beam is directed. The fibrous or other material used in the liquid or gel should preferably have a density of $\rho_1$, wave velocity $v_1$ and thickness $d$ when the liquid or gel has a density $\rho_2$ and a wave velocity $v_2$ such that the reflection R is between 5 per cent and 50 per cent as given by the formula $$R = \frac{\left(\frac{\rho_1 v_1}{\rho_2 v_2} - \frac{\rho_2 v_2}{\rho_1 v_1}\right)^2}{4 \cot^2 \frac{2\pi d}{\lambda^1} + \left(\frac{\rho_1 v_1}{\rho_2 v_2} + \frac{\rho_2 v_2}{\rho_1 v_1}\right)^2}$$

where $\lambda_1$ is the wave-length of the compressional wave in the material and $\pi = 3.1416''$. The density of the material multiplied by the velocity of a compressional wave therein is equal to the acoustic impedance of the material. Where the ratio of the acoustic impedances is $$n = \frac{\rho_1 v_1}{\rho_2 v_2}$$

$$R = \frac{(n^2-1)^2}{4n^2 \cot^2 \frac{2\pi d}{\lambda^1} + (n^2+1)^2}$$

Aimal wool fibers having a diameter of about 0.2 mil and aluminum wire having a diameter of about 0.5 mil come within the limitations set when the frequency of the compressional wave is of the order of 10 megacycles. In general the smallest dimension of the solid which is used in the liquid or gel should be approximately one-tenth to one-hundredth of a wave-length of the compressional wave in the solid material.

Figure 4:
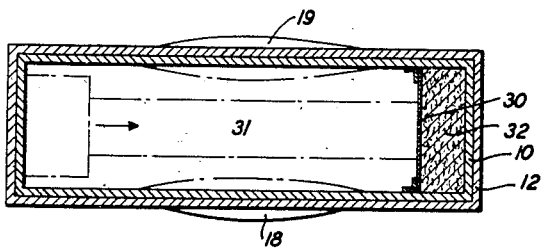
Fig. 4 is a view taken along the line 4—4 of Fig. 3.
Figure 3:
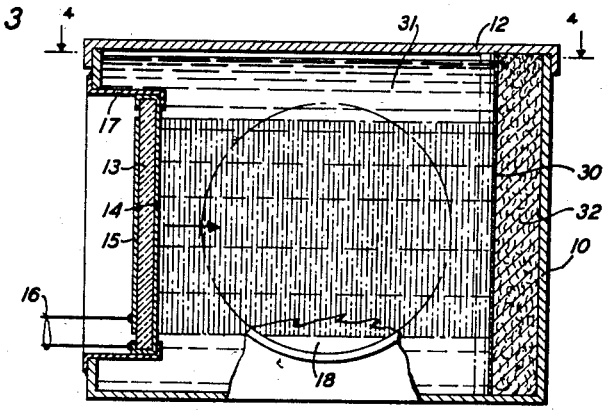
Fig. 3 is a view in front elevation partly in section of an ultrasonic cell which is a modification of the ultrasonic cell shown in Figs. 1 and 2.

With the exception pointed out below, the embodiment of the invention shown in Figs. 3 and 4 is like that shown in Figs. 1 and 2 and the corresponding parts are similarly designated. However, instead of employing gelatin in the liquid material in which the animal wool or fibrous material is immersed for preventing contamination of the liquid 31 through which light is directed, there is employed for this purpose a partition 30 which divides the tank 10 into two compartments. The absorber 32 comprises any solid material of the kind described above, a one-half inch thick pad of animal wool, for example, immersed in a liquid having an acoustic impedance equal to or nearly equal to that of the liquid 31. While the same liquid may be used in both compartments of the tank or reservoir, it may be preferable to employ for the absorber 32 a liquid having a higher absorption constant than that of the liquid 31. If the liquid 31 is water, for example, carbon disulphide or chloroform may be used in the absorber 32. The angle strips 21 are secured to the walls of the tank 10 and the partition material 30 is secured to the strips 21 in any suitable manner to prevent the travel of liquid from one compartment to the other if different liquids are employed or, if the same liquid is used in both compartments, to prevent the transfer of the fibrous or other solid material of absorber 32 into the liquid 31.

The partition 30 may be made of a material having an acoustic impedance approximately equal to that of the liquids used in the two compartments of the tank 10, for example, a plastic such as Lucite or cellulose acetate. Where the acoustic impedances are equal, there will be no reflection of compressional waves from the partition. The partition may also be made of a material such as metal, the acoustic impedance of which differs from that of the liquid in which case the thickness of the partition is preferably made equal to one-half wave-length of the compressional wave in the partition material in order to prevent reflection from the partition. The electric wave impressed upon the leads 16 is usually a carrier frequency wave, having a frequency of the order of one megacycle or higher, modulated in accordance with signals. Where the frequency band width of such a wave is small with respect to the carrier frequency, reflection of wave energy from the partition may also be substantially prevented by making the thickness of the partition an integral multiple of one-half wave-length of the carrier frequency wave in the partition material or by making the partition very thin with respect to a half wave-length.

What is claimed is:

1. The combination with a container, of a liquid wave propagating medium therein, vibrating means for setting up in said medium compressional waves having a frequency of the order of at least one megacycle, and means in said container for absorbing said waves after propagation through said medium, said absorbing means comprising a body of liquid the acoustic impedance of which substantially matches that of said medium, fibrous material in said body of liquid, and means for preventing intermingling of said liquids which means is incapable of reflecting an appreciable amount of said waves into said wave propagating medium.

2. The combination with a container of a liquid wave propagating medium therein, means for setting up compressional waves in said liquid medium, means in said container for absorbing the compressional waves propagated through said liquid wave propagating medium, said means comprising a second liquid and a fibrous material therein, said fibrous material being of such a nature that particles thereof would reach said liquid wave propagating medium if said liquids were permitted to intermingle and means for preventing intermingling of said liquids.

3. Light diffracting apparatus comprising a container having a body of transparent liquid therein, means for directing a light beam which is to be diffracted through said body of liquid, means for setting up compressional waves in said liquid to cause diffraction of the light beam and means having a compressional wave impedance substantially equal to that of said transparent liquid for absorbing the compressional waves propagated through said liquid and thereby preventing reflection of waves into said liquid, said last-mentioned means comprising a second liquid and a substance which, if it were present in said first-mentioned liquid, would cause unwanted scattering of light therein and means for restricting said second liquid to said wave absorbing means.

4. An absorber for compressional waves having a frequency of the order of at least one megacycle comprising a liquid and in said liquid fibers of a material having an acoustic impedance which differs from that of said liquid, the diameter of said fibers being less than 10 per cent of the wave-length therein of the compressional waves to be absorbed.

5. An absorber for compressional waves having a frequency of the order of at least one megacycle comprising a liquid and in said liquid fibers of a material having an acoustic impedance which differs from that of said liquid, the diameter of said fibers being between 1 per cent and 10 per cent of the wave-length therein of the compressional waves to be absorbed.

6. A compressional wave device comprising a container, a body of liquid in said container for propagating compressional waves set up therein, means for absorbing said compressional waves after being propagated through said body of liquid, said means comprising a second body of liquid having an acoustic impedance substantially equal to that of said first body of liquid and having a fibrous material therein, and a partition for separating said two bodies of liquid, the thickness of said partition being equal to a half wavelength in the partition material of the compressional waves set up in said first body of liquid or to an integral multiple thereof.

7. A compressional wave device comprising a container, a partition for dividing said container into two compartments, a body of liquid in one of said compartments for propagating compressional waves set up therein, a second body of liquid in said second compartment having a higher absorption constant than that of said first body of liquid and having an acoustic impedance substantially equal to that of said first body of liquid and a fibrous substance in said second body of liquid for increasing the absorption of compressional waves therein, said partition having a thickness equal to substantially one-half wavelength of said compressional waves in said partition.

8. A compressional wave device comprising a container, a liquid therein having compressional wave propagating properties substantially like those of dichloro-diethyl benzene, vibratory means for setting up compressional waves in said liquid, and means in contact with said liquid at a position remote from said vibratory means for absorbing the compressional waves set up in said liquid, said means comprising a gel in which is set a compact pad of animal wool, said means having an acoustic impedance substantially equal to that of said liquid, said gel comprising a liquid dispersion medium entrapped therein.

9. A compressional wave device comprising a container, a partition for dividing said container into two compartments, a liquid in one of said compartments having compressional wave propagating properties substantially like those of water, vibratory means remote from said partition for setting up compressional waves in said liquid, and means for absorbing the compressional waves propagated through said liquid in said one compartment comprising a second body of liquid in the second compartment having an acoustic impedance substantially equal to that of water and having an absorption constant substantially greater than that of water, and a compact pad of animal wool embedded in said second body of liquid, said partition having a thickness substantially equal to a half wave-length of said compressional waves therein or to an integral multiple thereof.

10. Means for absorbing compressional waves which have been propagated through a first body of liquid and which have one or more frequency components having a frequency of the order of one megacycle or higher, comprising a second body of liquid, a material of the nature of fibers or particles in said second liquid having a dimension equal to one-tenth to one-hundredth of a wave-length of the compressional wave in said material, and means for preventing intermingling of said two bodies of liquid.

11. Means for absorbing compressional waves which have been propagated through a first body of liquid and which have one or more frequency components having a frequency of the order of one megacycle or higher, comprising a second body of liquid, a material of the nature of fibers or particles in said second liquid, said material having the property of reflecting between 5 per cent and 50 per cent of the wave energy incident thereon, and means for preventing intermingling of said two bodies of liquid.

12. A compressional wave device comprising a container, a wave propagating liquid in said container, vibratory means for setting up compressional waves in said liquid, and means in contact with said liquid at a position remote from said vibratory means for absorbing the compressional waves set up in said liquid, said means comprising a gel having an entrapped liquid dispersion medium and in contact with said propagating liquid and a fibrous material in said gel, said wave propagating liquid having an acoustic impedance substantially equal to that of said liquid dispersion medium and said propagating liquid having the characteristic that it does not dissolve the gel or change its character.

13. The combination with a liquid for propagating compressional waves, of means in contact with said liquid for absorbing said compressional waves, said means comprising a gel having an entrapped liquid dispersion medium and a fibrous material in said gel, said gel being in contact with said wave propagating liquid, said wave propagating liquid having an acoustic impedance substantially equal to that of said liquid dispersion medium and said propagating liquid having the characteristic that it does not dissolve the gel or change its character.

14. The combination of claim 13 in which said wave propagating liquid is dichloro-diethyl benzene and in which said liquid dispersion medium is water.

GERALD W. WILLARD.